Nov. 6, 1956   W. B. BOLGER   2,769,397
COLLAPSIBLE CHAMBER FLUID HANDLING DEVICE
Filed Dec. 22, 1950   4 Sheets-Sheet 1

INVENTOR.
William B. Bolger,
BY
Gehr + Leonard,
his ATTORNEYS.

Nov. 6, 1956        W. B. BOLGER        2,769,397

COLLAPSIBLE CHAMBER FLUID HANDLING DEVICE

Filed Dec. 22, 1950        4 Sheets-Sheet 2

INVENTOR.
William B. Bolger,
BY
Gehr & Leonard,
his ATTORNEYS.

Nov. 6, 1956  W. B. BOLGER  2,769,397
COLLAPSIBLE CHAMBER FLUID HANDLING DEVICE
Filed Dec. 22, 1950.  4 Sheets-Sheet 3

INVENTOR.
William B. Bolger,
BY
Behr & Leonard,
his ATTORNEYS.

Nov. 6, 1956 W. B. BOLGER 2,769,397
COLLAPSIBLE CHAMBER FLUID HANDLING DEVICE
Filed Dec. 22, 1950 4 Sheets-Sheet 4

INVENTOR.
William B. Bolger,
BY
Gehr & Leonard,
his ATTORNEYS.

United States Patent Office 2,769,397
Patented Nov. 6, 1956

2,769,397

COLLAPSIBLE CHAMBER FLUID HANDLING DEVICE

William B. Bolger, Cleveland, Ohio

Application December 22, 1950, Serial No. 202,377

4 Claims. (Cl. 103—148)

This invention relates to a control valve for controlling the flow of liquids, slurries, and viscous materials, and granular dry materials such as chemicals, flour, grains and the like, and mixtures of any and all of the foregoing.

The valve generally is one which provides a direct and full-size unobstructed straight passage therethrough having substantially the same cross sectional size and shape as that of the passages to be controlled by the valve, whereby it is non-clogging and the parts are not subjected to appreciable wear in use.

The valve comprises essentially a rigid housing in which an elongated sleeve of resilient self-restoring material is secured by its ends and held under tension axially, the housing and sleeve being so arranged that the ends of the sleeve can be connected in a conduit line. The side walls of the housing are spaced from the side wall of the sleeve and inflatable tubes are arranged between two opposite side walls of the housing, respectively, and the adjacent side wall portions of the sleeve. The tubes are arranged for connection to, and disconnection from, a source of fluid pressure, selectively, by means of a suitable control valve so as to be expanded and thereby collapse and seal the sleeve, and released, respectively. When the tubes are disconnected from the source, due to the axial tension on the sleeve it restores itself to fully open condition, also urging the sleeves to deflated condition. Resilient means are provided for supporting the tubes so that they can accommodate themselves properly in the housing and in relation to the sleeve during inflation. The resilient means also assist the sleeve in restoring the tubes to deflated condition when they are disconnected from the pressure source.

The principal objects and advantages of the present invention will become apparent from the following description, wherein reference is made to the drawings, in which:

Fig. 1 is a side elevation of one embodiment of the present invention;

Figs. 2 and 3 are enlarged sectional views of the structure illustrated in Fig. 1 and are taken on the lines 2—2 and 3—3, respectively, of Fig. 1, and show the valve in closed condition;

Referring first to Figs. 1 through 6, the valve is shown connected to a storage tank T the flow from which is to be controlled. The valve comprises a rigid frame, indicated generally at 1 having an inlet portion 1a, to the lower end of which a sleeve 2 is connected in sealed relation. The sleeve 2 is preferably of resilient rubber and of substantially the same size and shape of the internal diameter of the inlet portion. The lower end of the sleeve 2 is connected to the housing 1 and is shown as arranged to discharge into the atmosphere but, if required, may be connected to a suitable conduit and the like. A suitable rigid frame 3, forming an intermediate part of the housing 1 surrounds the sleeve 2 between the upper and lower ends of the sleeve 2 and is of greater cross sectional width and length than the sleeve 2. The sleeve is mounted in the housing 1 in axially stretched condition so that normally it remains in its full open condition and, if collapsed transversely, can restore itself to full open condition with a snap action. With this arrangement, fluids, liquids and viscous material or granular materials normally can be discharged freely through the sleeve 2, the passage therethrough being free and unobstructed and preferably of the same size and cross sectional shape as the passage in the bottom of the tank T.

In order to open and close the passage through the sleeve 2 without introducing any obstructing valve mechanism thereinto, means are provided for compressing and collapsing the sleeve 2 transversely of its axis. It is desirable also that the closure of the passage through the sleeve 2 in this manner be accomplished even though some rigid article should happen to be between the walls of the sleeve at the point of closure.

To effect closure in such a manner, the closure means pressed against the sleeve must be flexible and such that, while maintaining the collapsing pressure, the closure means can conform to the exterior surface of the closed sleeve 2 even when the outer surface of the sleeve is distorted to an irregular contour by being pressed into closing position about a rigid article disposed in the sleeve at the point of closure. For this purpose, the closure means illustrated has been found satisfactory.

Figure 1:
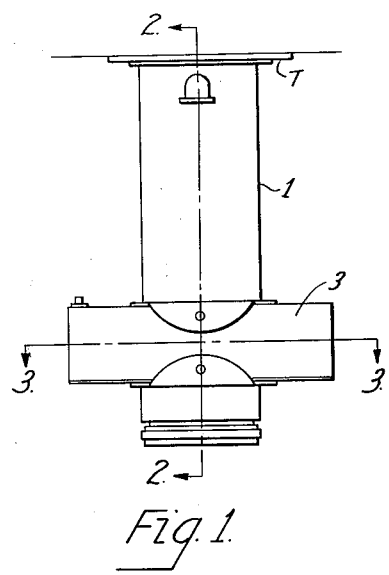
Figures 2, 4:
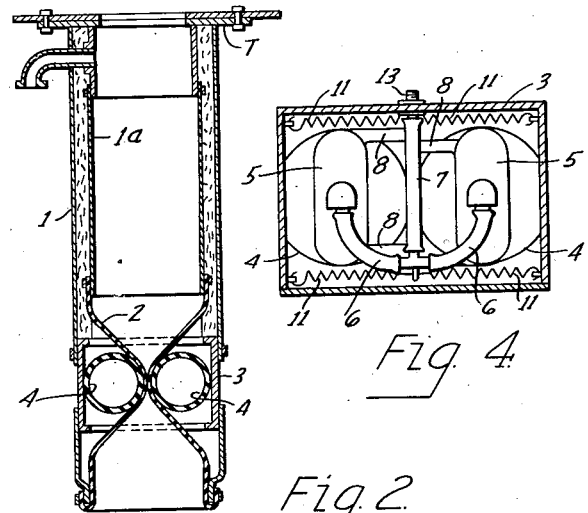
Fig. 4 is a sectional view taken on the line 4—4 of Fig. 3.
Figure 5:
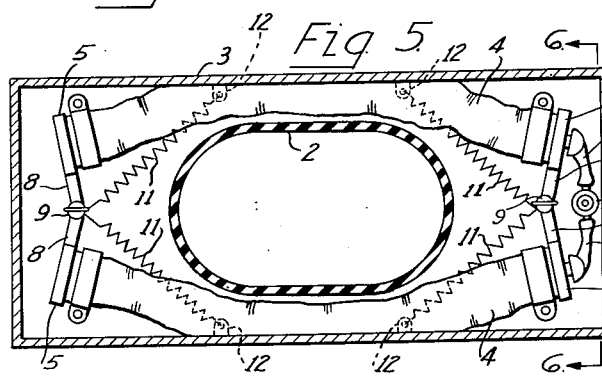
Fig. 5 is a sectional view, similar to Fig. 3, but showing the valve in open condition.
Figure 6:
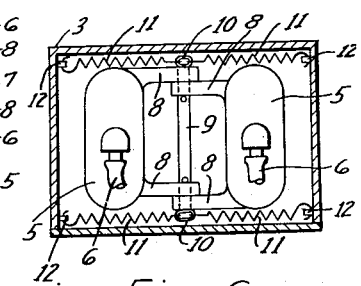
Fig. 6 is a sectional view taken on the line 6—6 of Fig. 5.
Figure 3:
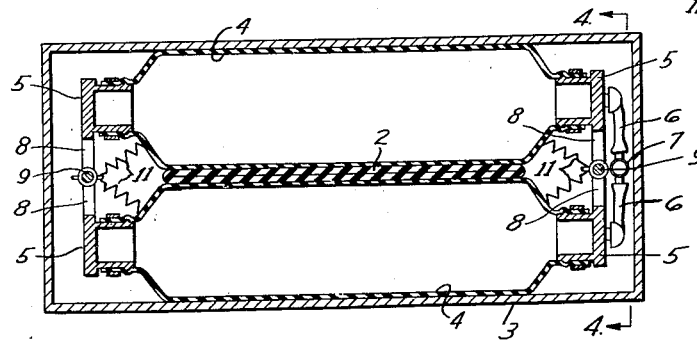

Referring to Figs. 2 through 6, this means comprises a pair of inflatable tubes 4 arranged in the frame portion 3 housing at opposite sides of the sleeve 2 and preferably extending parallel to each other in a direction transversely of the axis of the sleeve 2. Each of the tubes 4 is of sufficient length to extend beyond the sleeve 2 when the sleeve 2 is compressed to closed position as illustrated in Figs. 3 and 4. The tubes 4 are preferably resilient rubber laminated with fabric reinforcing and restraining strands. They are confined between the side walls of the housing and the adjacent wall portions of the sleeve 2. The tubes 4 are closed at both ends by suitable closure caps 5. Connected interiorly with the tubes 4, through the cap 5, at one end of each tube 4, are flexible hoses 6, respectively, which, in turn, are connected to a suitable flexible hose 7 which may be connected to a valve controlled source of fluid pressure, as will later be described.

Adjacent ends of the tubes 4 are provided with rigid arms 8 which extend transversely of the housing 1 and are pivotally connected together by suitable upright pivot rods 9. The pivot rods 9 preferably are positioned midway between the adjacent ends of the tubes 4 and each of the rods 9 is provided with eyes 10 at its opposite ends. In order to floatingly suspend the tubes in the proper position in the housing 1, the eyes 10 of the rods 9 are connected to the ends of pairs of springs 11, respectively. The opposite ends of each pair of springs are connected to opposite side walls, respectively, of the housing, as indicated at 12. Thus, the springs normally support the tubes 4 within the housing for resilient floating movement and normally urge the rods 9 toward each other so as to buckle the tubes 4 in a manner to cause the opposite ends of each tube to move concurrently relatively toward each other. This provides a floating movement of at least one end of each tube generally toward its opposite end. If floating movement of only one end is desired, a rigid pipe connection can be substituted for the hose 7. This movement of the tubes by the springs results in widening the space between the tubes so as to permit relatively free self restoration of the sleeve 2 to fully open position. Normally, the springs hold the tubes in the position illustrated in Fig. 5 in which the sleeve 2 is fully open and defines an unobstructed passage through the sleeve 2. The hose 7 is connected to a fitting 13 which, in turn, is connected to a suitable valve controlled source of fluid pressure, such as compressed air.

Upon the introduction of air under pressure through the hose 7, the tubes 4 are inflated and, since they are confined outwardly by the walls of the housing, press inwardly against the sleeve 2 and, while adjusting themselves to its outer contour, apply sufficient force to collapse and close fully the sleeve 2, as illustrated in Fig. 3. Since both tubes 4 have flexible surfaces they adjust themselves to any irregularity caused by rigid articles being caught between the contacting inner wall surface of the sleeve 2 and press the resilient or flexible walls of the sleeve 2 into closing relation tightly about the article. Upon release of the air pressure in the line 7, the springs 11 urge the tubes 4 to the position illustrated in Fig. 5 and the sleeve 2 snaps open, due to its being under axial tension, and its passage resumes its normal cross sectional shape.

Referring next to Figs. 7 through 14, a modified form of the invention is illustrated. As there shown a rigid housing 15 is provided and is preferably made in two half portions which are separated along a plane through the longitudinal axis of the housing. The housing is provided at both ends with flanges 16 and 17, respectively, which are adapted for connection to suitable conduits, hoppers and the like of which the flow is to be controlled.

In the form illustrated, the housing has an inlet 18 and an outlet 19 each of which may be in the form of an internally extending collar. A flexible resilient sleeve 20 is securely fastened at its ends to the collars 18 and 19, respectively. The passage in the sleeve normally is approximately the same cross sectional shape and size as the passages through the collars 18 and 19, but, if desired, the longitudinal mid-portion of the sleeve may be of slightly less width and correspondingly greater length than the normal passage so as to provide a passage portion of equal capacity to the remainder but of a shape facilitating collapse of the sleeve and elimination of wrinkling during collapse. The sleeve 20 is secured to the collars while the sleeve is held in longitudinally stretched condition so that it will open readily when no substantial pressure is applied to its outer wall.

Mounted within the housing between the side walls thereof at opposite sides of the tube 20 are inflatable tubes 21, similar in form and function to the tubes heretofore described. However, they are differently mounted in the housing for affording floating movement of at least one end of each tube endwise of the housing.

Figure 10:
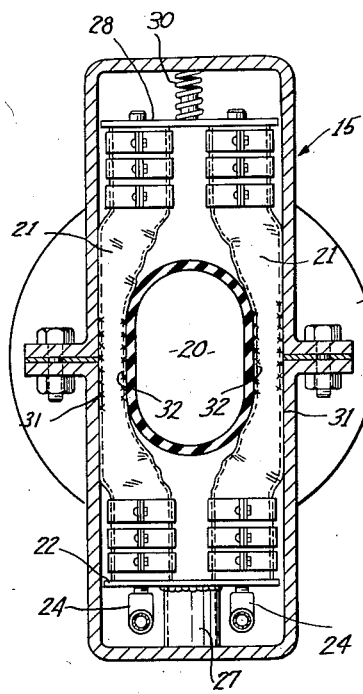
Fig. 10 is a sectional view taken on the line 10—10 of Fig. 9, part thereof being shown in elevation.
Figure 9:
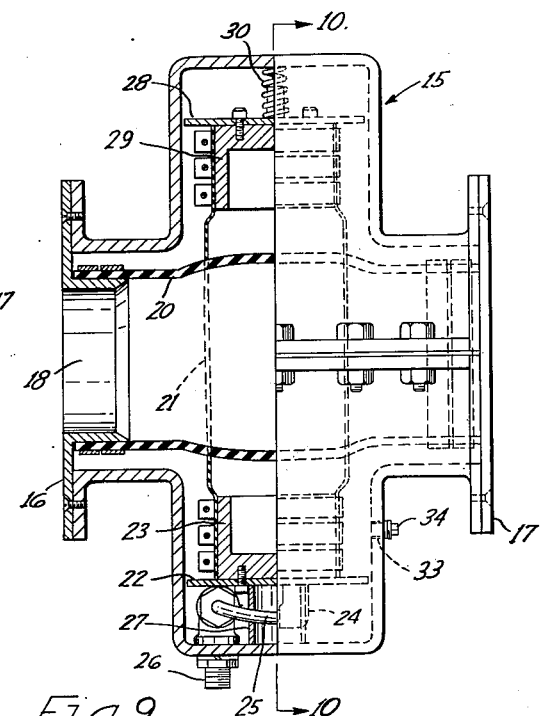
Fig. 9 is a side elevation, partly in section, taken on the line 9—9 of Fig. 8, an inflatable tube of the valve also being shown in section for clearness.
Figure 7:
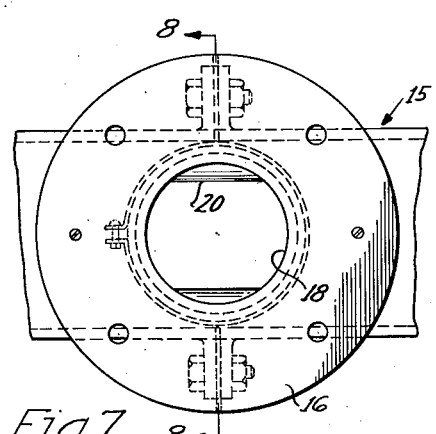
Fig. 7 is a fragmentary top plan view illustrating a modified form of the valve, and showing it in open condition.
Figure 8:
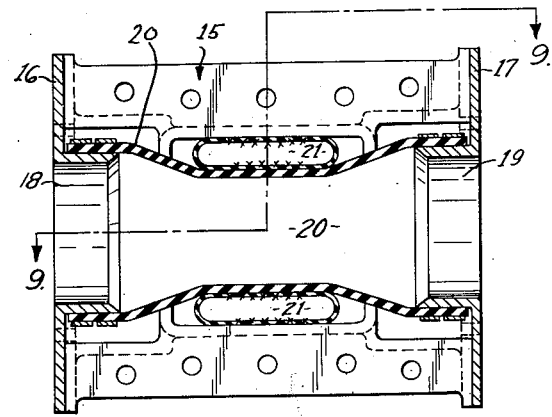
Fig. 8 is a cross sectional view taken on the line 8—8 of Fig. 7.
Figure 14:
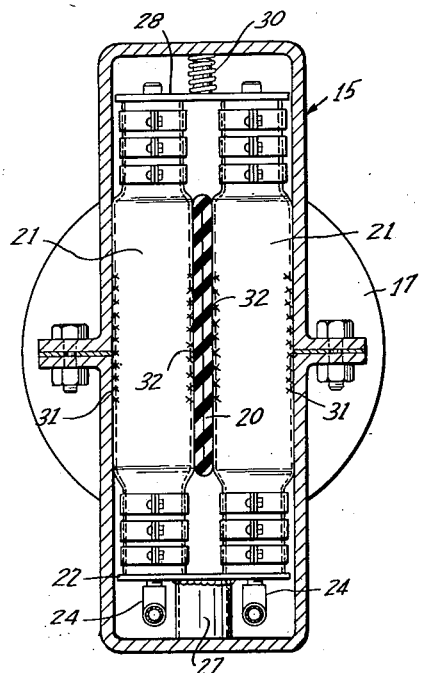
Fig. 14 is a sectional view taken on the line 14—14 of Fig. 13, part thereof being shown in elevation.
Figure 13:
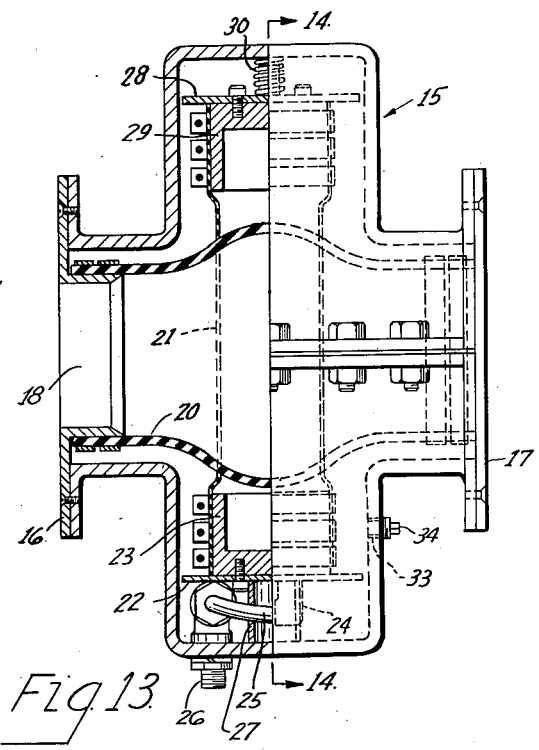
Fig. 13 is a side elevation, partly in section, taken on the line 13—13 of Fig. 12.
Figure 11:
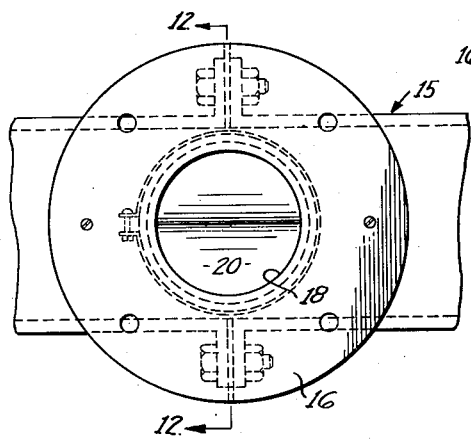
Fig. 11 is a view similar to Fig. 7 showing the valve in closed condition.
Figure 12:
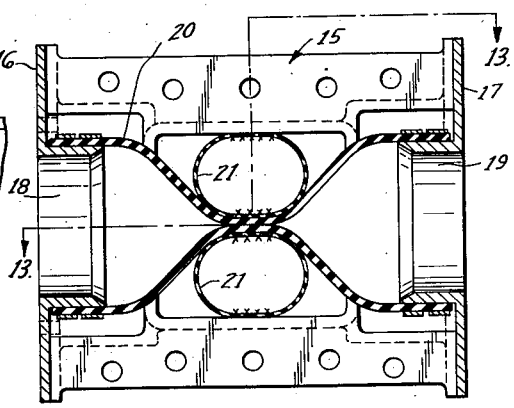
Fig. 12 is a sectional view taken on the line 12—12 of Fig. 11.

Referring to Figs. 9 and 10, there is provided at one end of the housing a plate 22 on which is a pair of collars 23 to which the adjacent ends of the tubes 21 are connected, respectively. Mounted on the plate 22 are suitable pipe fittings 24 which are in communication with the interior of the tubes 21 through the collars 23. The fittings 24, in turn, are connected by a suitable pipe 25 to a pipe 26 by which the interior of the tubes can be placed in communication with an outside source of positive or negative pressure. The plate 22 is mounted in the housing with slight operating clearance and is connected to a tie plate 27 which abuts the adjacent end of the housing and prevents movement of the tubes 21 endwise toward that end of the housing. At the opposite ends of the tubes is a plate 28 which is mounted in the housing with slight operating clearance so as to be movable flatwise of the housing toward and away from the sleeve 20. The plate 28 likewise is provided with suitable collars 29 respective to the tubes 21 and to which they are securely attached so as to seal each of the tubes 21 at that end.

A spring 30 is interposed between the plate 28 and the adjacent end of the housing and urge the plate 28 toward the sleeve 20 thus assisting in buckling the tubes 21 outwardly when they are deflated so as to widen the space therebetween. This action, coupled with the self-restoring capabilities of the sleeve 20 due to its being held under tension axially, causes a quick snap opening of the sleeve 20.

The device thus illustrated is to be used either with positive or negative pressure. When it is to be used with negative pressure, each inflatable tube 21 is bonded by suitable cement to the side wall of the housing, as indicated at 31, and to the adjacent side wall of the sleeve 20, as indicated at 32. These bonding areas extend only for a very short distance endwise of the tubes, as shown in Fig. 10, so as not to interfere with the accommodation of the tubes 21 to the contour of the sleeves 20. They need be only sufficient long so that the tubes 21, when connected to a source of sub-atmospheric pressure, can assist in opening the tube 20 by pulling its walls apart as they collapse.

The housing is also provided with a suitable opening 33 which may be closed by a plug 34. For use with positive pressure, air under positive pressure is admitted through the line 26 under the control of any suitable valve and the tubes 21 thereby are inflated and collapse and seal the tube 20, the tubes 21 elongating somewhat and compressing the spring 30. Upon release of the air pressure in the line 26 and connection of the same by the control valve to the atmosphere, or to a vacuum, the floating ends of the tubes, connected to the plate 28, are moved by the spring 30 toward the sleeve 20, thus widening the opening between the tubes 21 and the sleeve 20 opens fully with a snap action.

Figure 15:
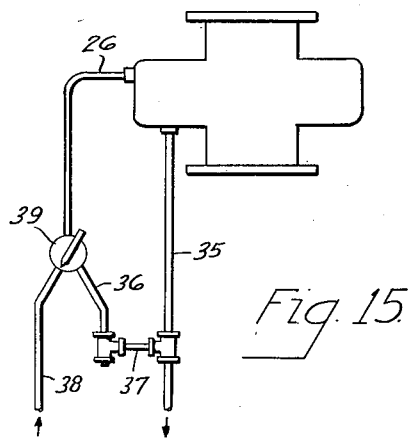
Fig. 15 is a diagrammatic illustration, showing the connection of the valve to the source of operating pressure fluid.

In some instances, as mentioned, it is desirable that the valve be used on a vacuum system, as illustrated in Fig. 15. In such an instance, the plug 34 is removed and the passage 33 is connected by a suitable pipe 35 to the source of sub-atmospheric pressure. The line 26 also is connected to a source of sub-atmospheric pressure through the lines 36 and 37, and to the atmosphere, or positive pressure source, through the line 38, a suitable two-way valve 39 being provided in the line 26 for connecting it to the vacuum through the line 36 and to the atmosphere through a line 38, selectively.

Assuming the sleeve 20 is to be maintained in open position, the valve 39 is set to admit sub-atmospheric pressure to the line 26. The interior of the housing is subject to sub-atmospheric pressure through the pipe 35. Accordingly, the tubes 21 are collapsed and the sleeve 20 is fully open. Upon reversing the valve so as to connect the pipe 26 to the atmosphere or to a source of positive pressure, the tubes 21 are inflated and close the sleeve 20. Since the inside of the casing preferably is under negative pressure at all times, upon connection of the tubes 21 to the vacuum, not only they but the vacuum in the housing assist in opening the sleeve 20. The connection of the housing to sub-atmospheric pressure is particularly desirable in those instances in which the sleeve 20 is connected in conduit system maintained at sub-atmospheric pressures as the sub-atmospheric pressures on the inside and outside of the sleeve tend to balance each other and not interfere with the operation of the sleeve. If a source of sub-atmospheric pressure lower than that in the sleeve is available, the tubes do not have to be bonded to the sleeve or to the housing.

Figure 16:
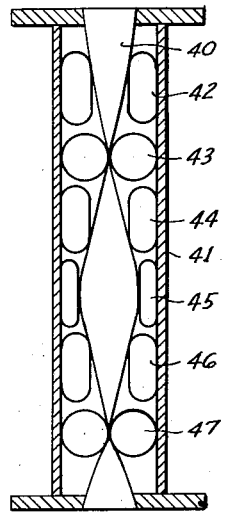
Fig. 16 is a diagrammatic illustration of a special application of the valve.
Figure 17:
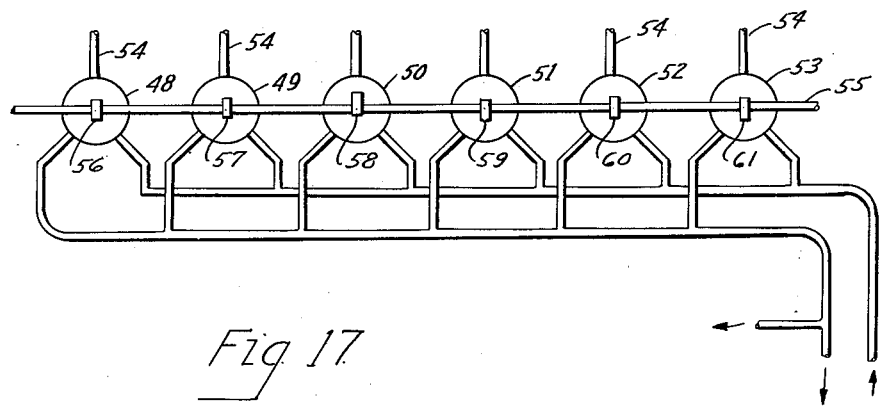
Fig. 17 is a diagrammatic illustration of a special application of the control arrangement for the structure shown in Fig. 16.

Referring next to Figs. 16 and 17, there is shown diagrammatically an installation of the device for specialized purposes. In this form of the device a resilient sleeve 40 is provided and is mounted in a rigid housing 41, the sleeve 40 being similar to the sleeves 2 and 20, heretofore described, and held under axial tension, but being considerably longer. Within the housing 41 are a plurality of sets of inflatable tubes 42 through 47, each set corresponding in form and function to the tubes 21. These sets of tubes are connected to valves 48 through 53, respectively. Each valve is arranged to connect its set of tubes, selectively, to a source of air under pressure and to a vacuum or atmosphere by means of pipes, such as indicated at 54, corresponding to the line 26. The valves 48 through 53 are operated in a predetermined sequence with respect to each other.

For purposes of illustration, the operating means comprises a single cam shaft 55, carrying a plurality of cams 56 through 61, respective to the valves 48 through 53. These valves are operated in such sequence that the sleeve 40 can be progressively closed from its inlet end part way of its length, progressively opened from the point of closure for an additional distance toward its discharge end, and progressively closed again prior to reaching the discharge end and then opened therebeyond, preferably providing at all times at least two points of closure. It can be released in like manner for full opening or partial opening. Thus the points of full opening and closing migrate unidirectionally continuously from the inlet end to the outlet end at a relatively uniform speed while maintaining a spaced relation to each other.

For example, the valves 48 through 53 may be operated in sequence so that as the sleeve 40 is being released by the tubes 42, it is fully closed by the tubes 43 which are just ready to release, is being closed by tubes 44, is fully released, and open, by tubes 45 which are just ready to start closing, is being released by tubes 46, and is closed by tubes 47 which are just ready to start releasing.

The advantages of such an arrangement are particularly pronounced in the case of chemicals which are to be fed from one tank, which is under vacuum, into another tank, which is under atmospheric pressure without breaking the vacuum. The need for such often arises where chemicals are to be so fed from a vacuum tank for mixing with other materials being fed into an open tank or vat. For example, if only one valve of the present invention were used, a certain amount of material would be run into an intermediate collecting hopper under vacuum, the valve closed and the hopper then opened, dumped into the mixing tank, and the hopper then evacuated, and the steps repeated. This, however, would necessitate discharge of relatively large quantities of the material from the vacuum tank at relatively long intervals. By the use of the last described present arrangement, however, the material can be discharged from the vacuum tank in greatly reduced quantities but at relatively short intervals, the sleeve itself acting as a travelling series of accumulating hoppers. Thus, a pulsating flow of material through the sleeve is obtained and by multiplying the number of sets of tubes cooperating therewith, these pulsations can be made so short and so relatively close together that a practically constant flow of material from a vacuum tank into the atmosphere can be obtained without breaking the vacuum inasmuch as the tank is always effectively sealed from the atmosphere.

Likewise this arrangement provides a pulsating pumping effect by which the material can be forced along the sleeve so that gravity feed is not necessary.

Instead of a single elongated sleeve, a plurality of valves, such as disclosed in Figs. 11 through 15, may be connected in series with each other for obtaining a similar effect, though not as pronounced as that obtained by a single sleeve with a plurality of pairs of inflatable tubes arranged close together endwise of the sleeve.

Having thus described my invention, I claim:

1. A flow control device comprising a resilient sleeve having an axial passage therethrough and being collapsible transversely for closing its passage, means spaced apart endwise of the sleeve and supporting the sleeve and maintaining it under endwise tension under all operating conditions, a rigid confining housing having walls spaced at opposite sides of the sleeve, flexible inflatable tubes interposed between the sleeve and each of said spaced walls, respectively, at a position between said means, each of said inflatable tubes having wall portions intermediate its ends, with one of said wall portions secured to the sleeve for movement therewith in the sleeve opening direction and with the other of said wall portions secured to the housing, connecting means to connect one end of the sleeve to a source of flowable material, and means on the flexible tubes, independent of said connecting means and uncommunicated therewith, for connecting them to a source of pressure fluid.

2. A device for the purposes described comprising a housing, an elongated resilient normally open sleeve in the housing and spaced from opposite walls thereof, connecting means spaced apart endwise of the sleeve and supporting and holding the sleeve under tension endwise, a plurality of pairs of inflatable tubes arranged in the housing, the tubes of each pair being on opposite sides of the sleeve between the sleeve and the adjacent ones of said side walls, respectively, each pair being disposed at a different position lengthwise of the sleeve than the other pairs, and means for inflating and deflating the tubes of each pair in a predetermined timed relation to those of the other pairs.

3. A device according to claim 2 characterized in that control valves are provided for the pairs of inflatable tubes, respectively, each control valve being operative for connecting the inflatable tubes of its pair to, and disconnecting them from, a source of operating fluid pressure, selectively, and a common control means operatively connected to all of the control valves for operating them in predetermined timed relation to each other.

4. A device for the purposes described comprising a housing, an elongated flexible normally open sleeve therein, connecting means holding the sleeve under tension endwise under all operating conditions of the sleeve, said housing having a wall extending alongside one side of the sleeve, a plurality of inflatable tubes arranged between the sleeve and wall and each extending at an abrupt angle to the length of the sleeve, each tube being disposed at a different position lengthwise of the sleeve than the others, and means for inflating and deflating the tubes in a predetermined timed relation to each other.

(References on following page)

References Cited in the file of this patent

UNITED STATES PATENTS

| | | |
|---|---|---|
| 1,060,261 | Judson | Apr. 29, 1913 |
| 1,244,205 | Heck | Oct. 23, 1917 |
| 1,284,465 | Ryan | Nov. 12, 1918 |
| 1,495,724 | Blake | May 27, 1924 |
| 1,873,138 | Mitchell | Aug. 23, 1932 |
| 1,922,196 | Butler | Aug. 15, 1933 |
| 2,412,397 | Harper | Dec. 10, 1946 |
| 2,446,620 | Swallow | Aug. 10, 1948 |
| 2,492,149 | Heuver | Dec. 27, 1949 |
| 2,575,240 | Thompson | Nov. 13, 1951 |
| 2,612,186 | Bolger | Sept. 30, 1952 |

FOREIGN PATENTS

| | | |
|---|---|---|
| 371,681 | Italy | June 1, 1939 |
| 582,032 | Great Britain | Nov. 1, 1946 |